US009684761B1

(12) United States Patent
Lamant (10) Patent No.: US 9,684,761 B1
(45) Date of Patent: Jun. 20, 2017

(54) METHOD FOR REPRESENTING A PHOTONIC WAVEGUIDE PORT AND PORT SPECIFICATION

(71) Applicant: CADENCE DESIGN SYSTEMS, INC., San Jose, CA (US)

(72) Inventor: Gilles S. C. Lamant, Sunnyvale, CA (US)

(73) Assignee: Cadence Design Systems, Inc., San Jose, CA (US)

(*) Notice: Subject to any disclaimer, the term of this patent is extended or adjusted under 35 U.S.C. 154(b) by 0 days.

(21) Appl. No.: 15/077,808

(22) Filed: Mar. 22, 2016

(51) Int. Cl.
*G06F 17/50* (2006.01)

(52) U.S. Cl.
CPC ...... *G06F 17/5081* (2013.01); *G06F 17/5045* (2013.01)

(58) Field of Classification Search
CPC .................................................. G06F 17/5081
USPC ............................................................ 716/102
See application file for complete search history.

(56) References Cited

U.S. PATENT DOCUMENTS

| 2016/0055289 A1* | 2/2016 | Cao ................... G06F 17/5081 716/112 |
| 2016/0171149 A1* | 6/2016 | Alloatti ............. G06F 17/5081 716/52 |

* cited by examiner

*Primary Examiner* — Suresh Memula
(74) *Attorney, Agent, or Firm* — Eric L. Sophir; Dentons US LLP (57) ABSTRACT

Disclosed herein are embodiments of an interactive design tool for designing electronic and photonic circuits, where features of the design may be displayed on the interactive layout GUIs as design objects. Design objects in a design database may include various types of design features, such as circuits, pins or ports, wires, and photonic waveguides. The design objects may be displayed on interactive layout GUIs according to the attribute data stored in the design database. The design objects may also be displayed according to a type of design feature represented by the design object. For example, the embodiments described herein may represent a "port" as having a shape and size that comports with the eccentricities of both electrical and photonic designs. A port may be a hierarchical connection element in the database allowing the logical and physical connection between an instance and the geometries in the corresponding instance master.

19 Claims, 11 Drawing Sheets

Interactive Layout Interface 900 Displaying Photonic ports
Displayed on Top Level and Instances (Level +1)

Interactive Layout Interface 900 Displaying Photonic ports Displayed on Top Level and Instances (Level +1)

Top level (Display level = 0 & Display level = 1), before and after creation of top-level tapered waveguide

METHOD FOR REPRESENTING A PHOTONIC WAVEGUIDE PORT AND PORT SPECIFICATION

TECHNICAL FIELD

This application relates generally to optical and electronic circuit design tools.

BACKGROUND

Integrated circuit and optical circuit design are accomplished using specialized software programs and data standards that allow designers to visually interact with various phases of an ongoing circuit design project. In some cases, the software can then intelligently manipulate the design further, either in tandem with the designer or in subsequent design phases, according to industry design standards and predetermined design compliance rules. However, existing software applications may have shortcomings when it comes to designing hybrid circuits containing both electrical and photonic components. Thus, as photonics grows in popularity, there is a need for better integrated Electronic Design Automation (EDA) and Photonic Design Automation (PDA), sometimes referred to as Electronic/Photonic Design Automation (EPDA).

As explained below, existing solutions are often inadequate for handling the generation and display of ports, facets, and other components related to waveguides in, a layout interface for an electronic circuit design. What is needed is a more integrated way of managing and generating display data relating to port connections for waveguides, in design software that is compatible with hybrid circuit designs in which electrical design and photonics design concepts are used to design a circuit comprising both electrical and photonics circuit components.

A number of characteristics for EDA design present challenges in adequately generating graphical design layouts for hybrid circuits. Examples of such challenges include a mandated grid-like or semi grid-like construction of wires, sometimes called nets, and components in the design layout interface; a hierarchical approach to electronic design; and a grid-like structure for the geometric shapes representing the components.

Figure 1:
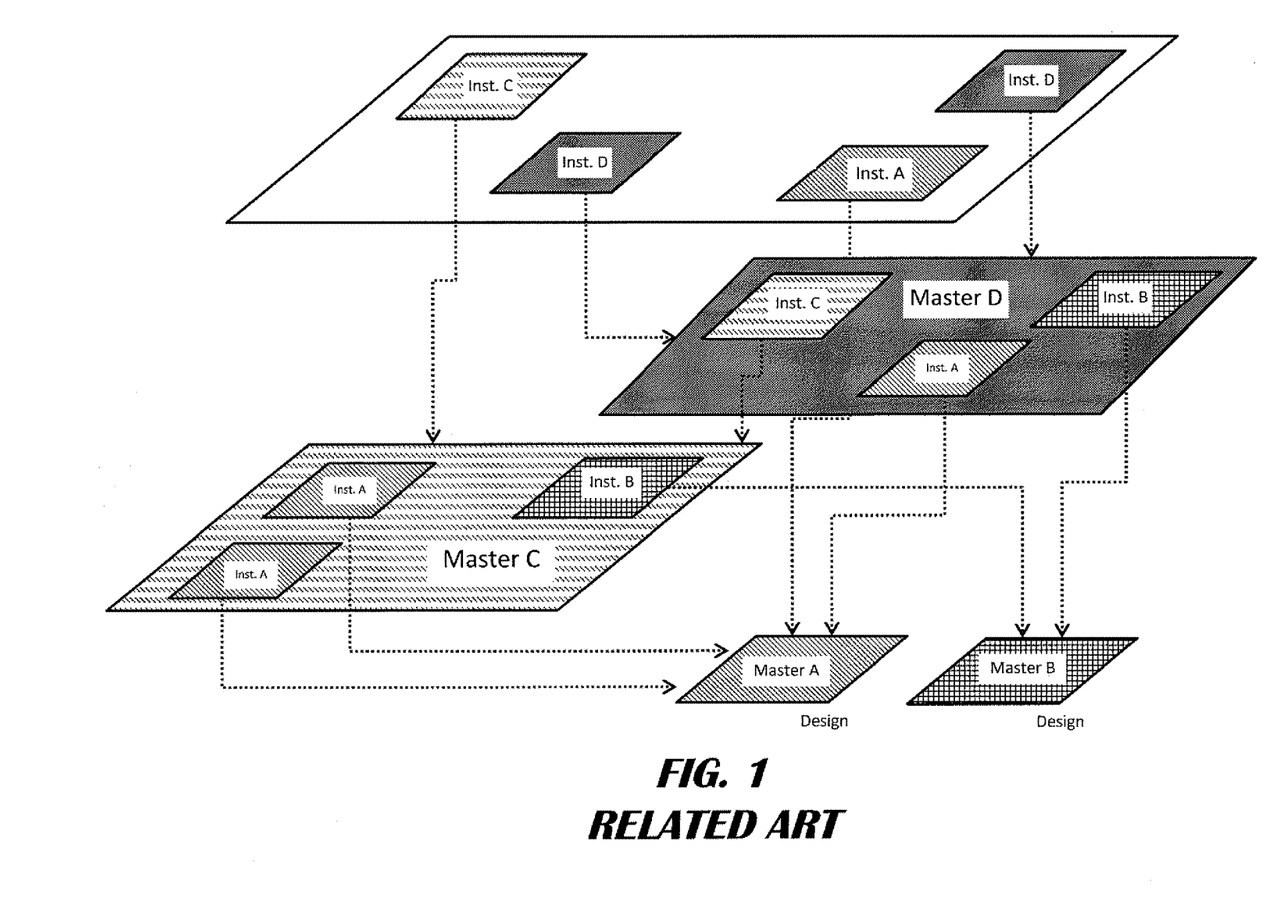
FIG. 1 shows an exemplary hierarchy for an electronic design database. The figure shows the various relationships between components of the design.

FIG. 1 shows an exemplary hierarchy for an electronic design database. The figure shows the various relationships between components of a conventional EDA-based design. Non-limiting examples of components of an EDA design may include master instances, instantiated instances or terminals, and nets (not shown). At the "lowest" hierarchical level, a port or pin object represents a pin in a design database, and is represented as a figure connected to an instance and a net (e.g., wiring). At the next hierarchical level upwards in the design hierarchy, a net connecting two ports of two instances is actually connected to an instance that, in turn, points back to the master terminal. Relating electronic hierarchical design concepts to photonics design is not straightforward. Photonics design has the general concept of hierarchical levels. However, conventional PDA software does not apply hierarchical levels in the same way as EDA software, because PDA software only needs to rely on the inherent hierarchical structure of the programming languages driving the PDA software (e.g., Java classes). Conventional PDA software therefore does not enforce or rely on hierarchical structures in the same way as EDA software, which is traditionally linked closely to the concepts of design hierarchy.

Figure 2:
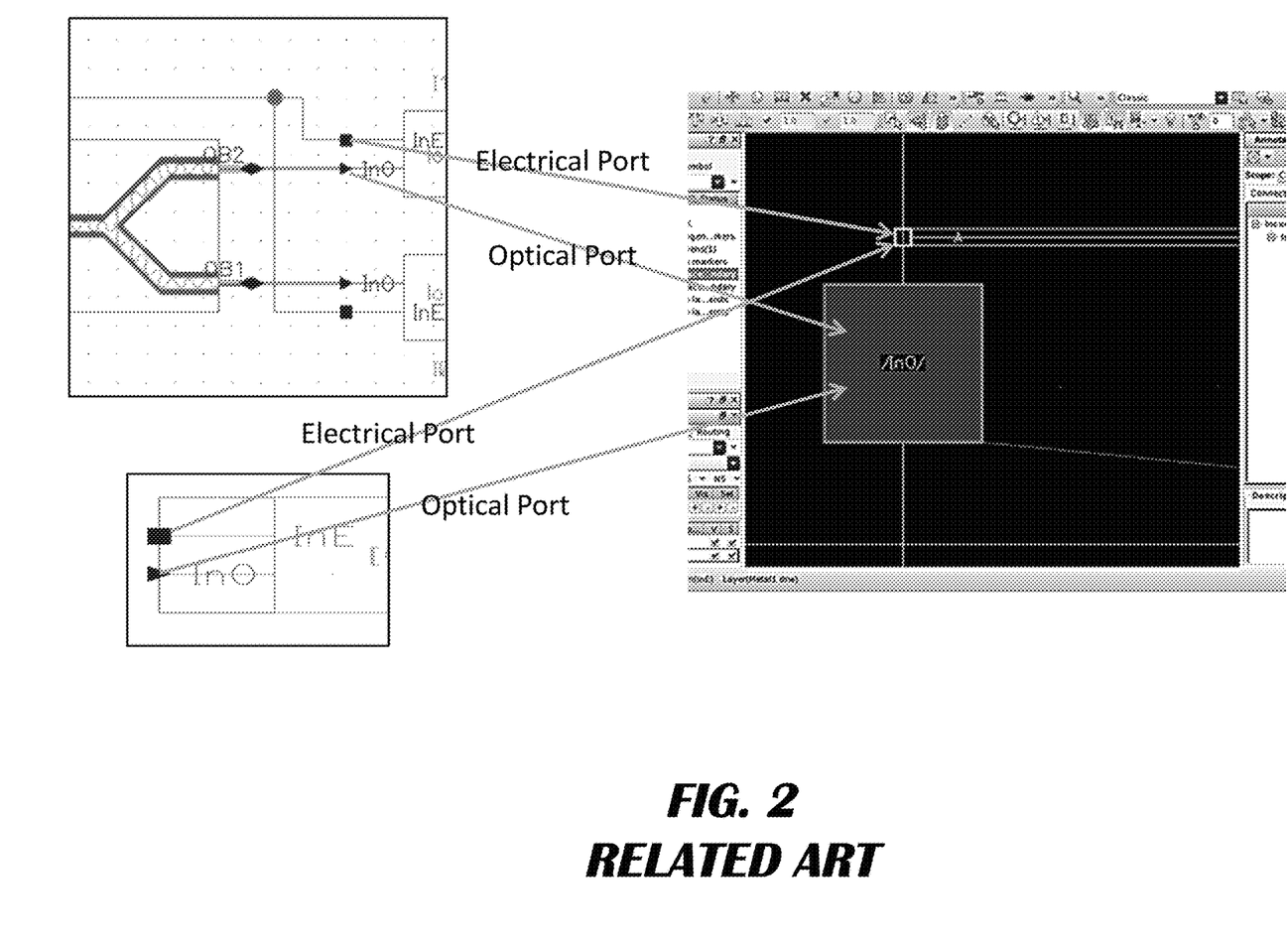
FIG. 2 shows the results of translation of components in schematic-driven EDA design software that supports photonics design.

FIG. 2 shows the results of translation of components in schematic-driven EDA design software that supports photonics design. In FIG. 2, components of an ongoing design project are transitioned from a database schematic display to a layout interface containing representations of physical electrical ports and optical ports from the schematic. The schematic contains representations of electrical wiring and waveguides, as well as the corresponding ports. Where the connections meet an instance, there is a representation of a port corresponding to the type of connection. In the corresponding layout interface, these ports are each represented as squares in one or more hierarchical layers displayed at the layout interface, regardless of the type of connection.

Figure 3:
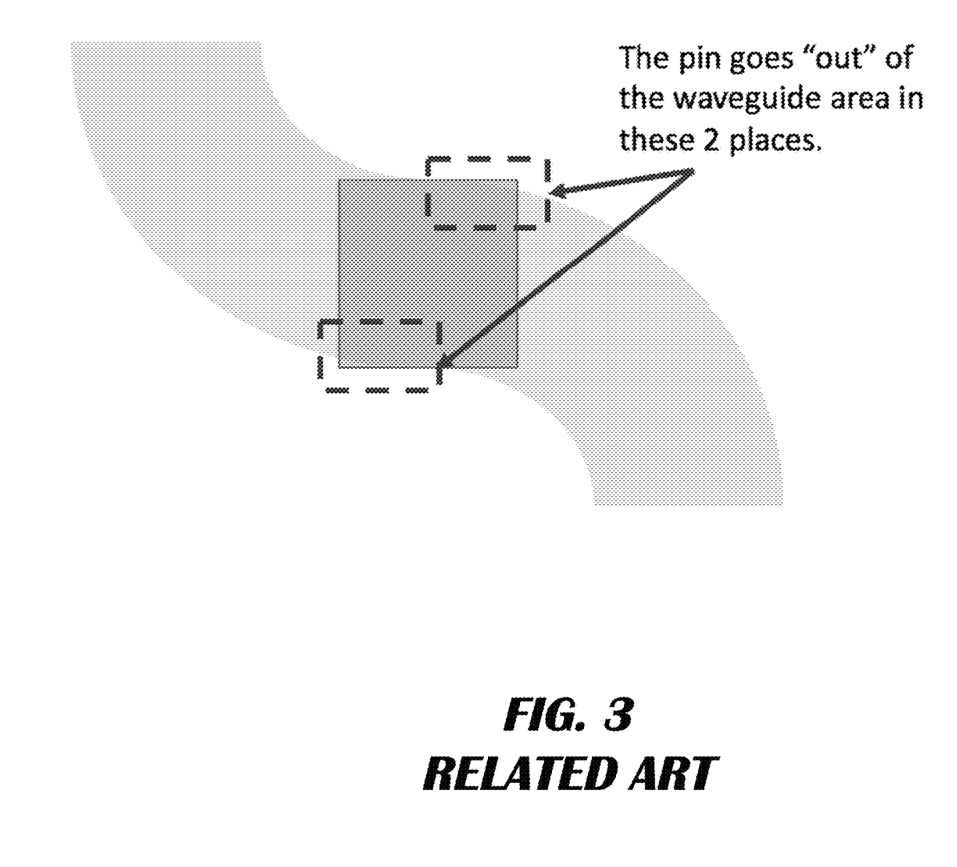
FIG. 3 shows components of a waveguide and port according to conventional design software tools.

FIG. 3 shows components of a waveguide and port according to conventional design software tools. As shown in FIG. 3, EDA software often uses a grid-like rendering and a structured, grid-like logical approach to design, and thus wiring, ports, circuits, and other design features are constrained to rigid representations. For example, a port representing hierarchical connections between higher and lower level hierarchical features are often represented as a square-shaped figure, displayed on the layer of the desired port with the appropriate connectivity structure in the design database. To comport with the grid-like structure of the EDA, the width of the square is equal to the width of the required wiring. But this rigid grid-like structure does not work for photonics designs, because photonics waveguides are often curved. As exemplified by FIG. 3, unless the pin is located at straight section of the waveguide, where the length of the waveguide is greater than or equal to the width, the traditional square-shaped pin of the conventional EDA software will protrude from the curvature of the waveguide. Correspondingly, the conventional square-shaped port of EDA software requires a shape that can fit within the curving shape of the waveguides. What is needed is a means of representing waveguide ports in an electrical design layout using graphical characteristics that would fit within a waveguide object.

Figure 4:
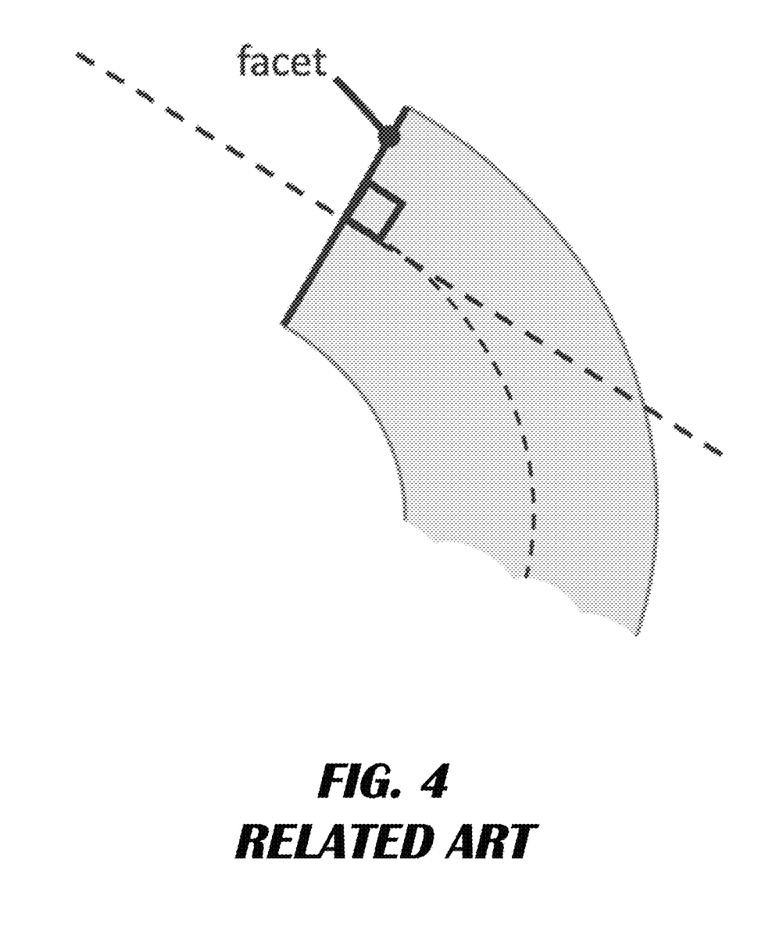
FIG. 4 shows an illustration of a waveguide and a facet of the waveguide.

PDA software uses a concept of access direction that was not originally intended to be represented or handled in conventional EDA software interfaces and/or conventional EDA-oriented databases. FIG. 4 shows an illustration of a waveguide and a facet of the waveguide. A facet is the edge of the waveguide shape perpendicular to the waveguide centerline at an end of the waveguide, where the waveguide intersects the port. Unlike the rigid structural requirements of conventional EDA designs, a waveguide facet may intersect a port at nearly any angle. So EDA software intending to handle photonics design needs to be capable of handling data and displays for objects and ports that intersect at any angle, instead of the stiff structural requirements typically found in EDA software. The waveguide may also enter and exit ports through either "side" of a particular feature or component of a design, at the same or different hierarchical level. To capture this, PDA tools have developed data representing access direction attributes for photonics design elements. Again, due to the rigid grid-like structural requirements enforced by conventional EDA software, the representations of ports and intersecting facets in EDA software often do not adequately account for or convey the broad possibilities of access direction for waveguides intersecting a port.

Figure 5:
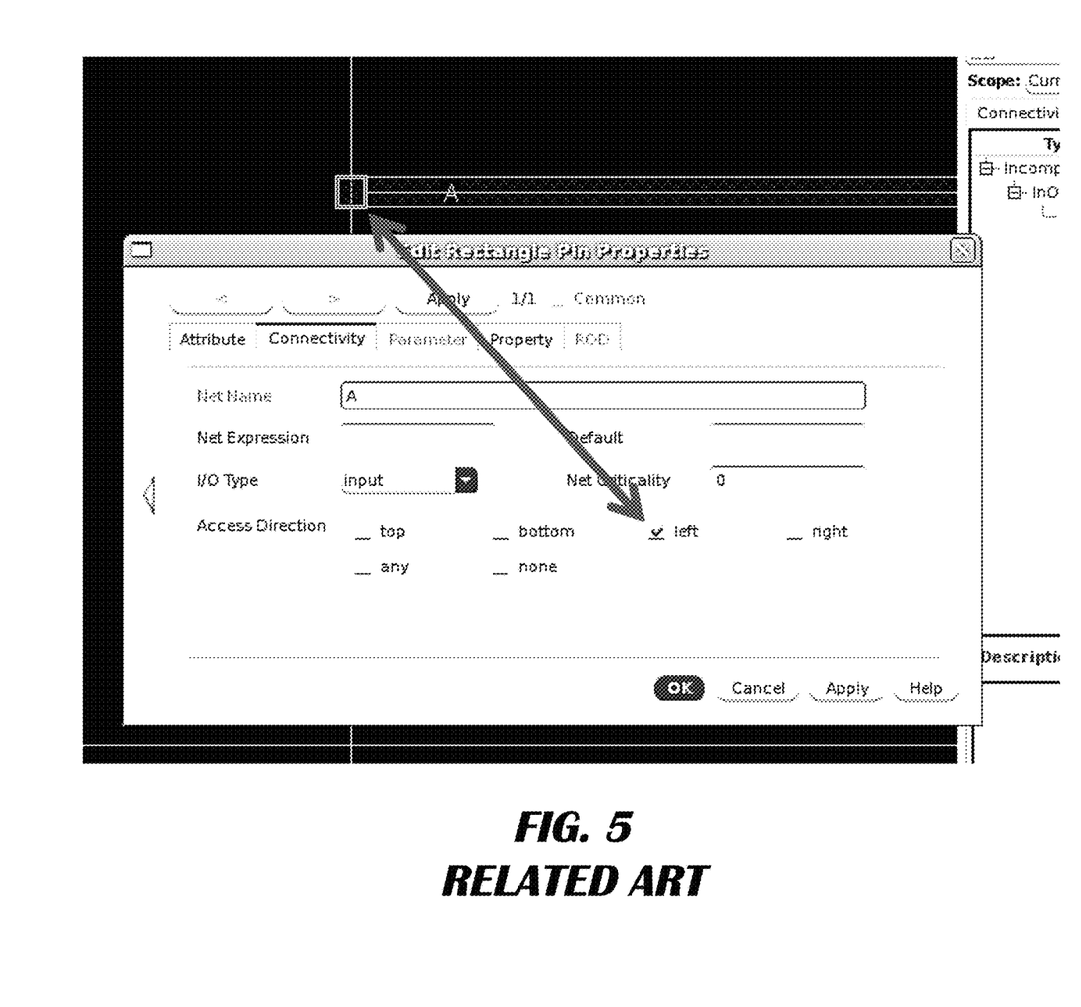
FIG. 5 shows a graphical user interface of a conventional EDA software product, in which access direction in an electronic design layout for a port is represented by a square.

FIG. 5 shows a graphical user interface of a conventional EDA software product, in which access direction in an electronic design layout for a port is represented by a square. In EDA software, the ports or pins have implied access directions, sometimes referred to as "inside" and "outside"

access directions. In the EDA software, the access directions can be simplistic and grid-like, such as left, right, top, or bottom access directions for the pins. But this is often too simplistic and inadequate for optical ports, because waveguides could conceivably have a facet arriving at any angle to the port. For optical waveguide port descriptions, the system may need to clearly define the "inside" side of the port, where the waveguide of a current level connecting to a port for the master instance will be created, and the "outside" side of the port, where the next level of optical interconnect will be created to the instance of the master instances, with respect to the facet angle.

As mentioned previously, the PDA design software usually does not represent databases with hierarchy. Most PDA layout editors have a programming language-based approach to building the layout design. Although these scripting or programming languages may have an inherent procedural hierarchy (e.g., Java classes), the scripting languages do not have a hierarchical approach to the design itself. As a result, PDA software frequently does not need or require a design step where only the ports are displayed on the display layout GUI. In operation, PDA design software typically generates and presents on a layout GUI the waveguide polygons, thereby defining the facets of the waveguide polygons. As a result, PDA methodology traditionally do not use or require the concept of an independent port, existing alone without a waveguide. In other words, PDA design software products are frequently unable to represent the hierarchical structures of the EDA designs, and do not require an explicit definition of "outside" and "inside" for the features. Thus, the solutions of PDA design software are not a total solution.

What is needed is a means for representing certain objects in hybrid circuit designs, such as optical ports, on an interactive design interface in way that is useful and comprehensible to a user (e.g., circuit designer, chip designer), but does not disrupt the underlying logical relationships between database objects. What is needed, then, are software and hardware computing components capable of generating, storing, querying, and updating data attributes for objects in a design database in a way that conventional EDA and PDA tools have not implemented. Correspondingly, what is also needed are software and hardware computing components capable of generating an interactive display for various hierarchical levels of a design using the data stored in the design database, where the interactive display and underlying computing components can query and manipulate the data in the design database, and thus generates an interactive display for a more fully-integrated EDPA software tool.

SUMMARY

Disclosed herein are systems and methods that address the shortcomings in the related art, and may provide additional or alternative advantages as well. The embodiments disclosed herein may generate interactive graphical user interfaces (GUIs) of display layouts that may display ports, as well as generate and manipulate data related to displaying those ports. The embodiments may generate and manipulate data used to define the interfaces between levels of hierarchy based on that port data, and then generate GUIs displaying representations of those interfaces using the data generated and manipulated by the systems and methods disclosed herein. Hardware and software components may support an interactive design tool for electronic and photonic design, allowing users, such as chip or circuit designers, to generate and update various features of a design using an interactive GUI. The features of the design may be displayed on the interactive layout GUIs as design objects. A design object may have various attributes stored in fields of a database record of the object, stored in a design object database. Design objects may include various types of design features, such as circuits, pins or ports, wires, and photonic waveguides. The design objects may be displayed on the interactive layout GUIs according to the attribute data stored in the corresponding database records. The design objects may also be displayed according to a type of design feature represented by the design object. For example, the embodiments described herein may represent a "port" as having a shape and size that comports with the eccentricities of both electrical and photonic designs. A port may be a hierarchical connection element in the database allowing the logical and physical connection between an instance and the geometries in the corresponding instance master.

The embodiments described herein may generate and manipulate a physical representation for an optical pin figure, using additional formal parameters to capture the "any angle" physical characteristics of photonics, but in a way to display this information in an interactive editor software application that is used for both EDA and PDA. The layout display GUI may display interactive representations of hierarchical design layouts and instances, and may also support design and representations of both electrical and photonic design components. The embodiments may generate and use additional photonic-specific data extensions and attributes to the pin and/or pin graphics to effectively represent photonic-specific properties.

In an embodiment, a computer-implemented comprises receiving, by a computer, a set of attributes of a port object from a design database configured to store one or more sets of attributes of one or more design objects respectively, the set of attributes of the port object comprising a port location; receiving, by the computer, a set of attributes of a facet object from the design database, the set of attributes of the facet object comprising a width attribute, a radius attribute, and an angle attribute, the facet object comprising a facet location intersecting the port location; determining, by the computer, an access direction based upon the angle attribute; and based upon the angle attribute, the width attribute, the radius attribute, and the access direction: generating, by the computer, a representation of the port object, a representation of the facet object, a representation of a direction indicator based on the access direction, and a representation of a radius indicator on an interactive design interface representing a design layout.

In another embodiment, a computer system comprises a design database hosted on one or more computing devices comprising non-transitory machine-readable storage media configured to store one or more sets of one or more design objects respectively; and a computer coupled to the design database and comprising a processor configured to: receive a set of attributes of a port object from the design database, the set of attributes of the port object comprising a port location; receive a set of attributes of a facet object from the design database, the set of attributes of the facet object comprising a width attribute, a radius attribute, and an angle attribute, the facet object comprising a facet location intersecting the port location; determine an access direction based upon the angle attribute; and based upon the angle attribute, the width attribute, the radius attribute, and the access direction: generate an interactive design interface representing a design layout and comprising a representation of a port object, a representation of the facet object, a representation of a direction indicator, and a representation of a radius indicator.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

It should be appreciated that, although the various embodiments described herein discuss implementing the various features for generating and representing data for photonics and electronics designs, it should be appreciated that the various types of data and graphical interfaces could be implemented in RF circuitry design (e.g., micro-strips, microchips). For example, similar to photonics, RF microstrips may present similar "any angle" characteristics, and thus the graphical layout interfaces and the types of data described herein may be useful for representing such components.

In the embodiments described herein, it is intended that any representations of a particular attribute on a graphical user interface may be represented in a different manner than is shown and is not limited to the representation described in the exemplary embodiment.

Figure 6:
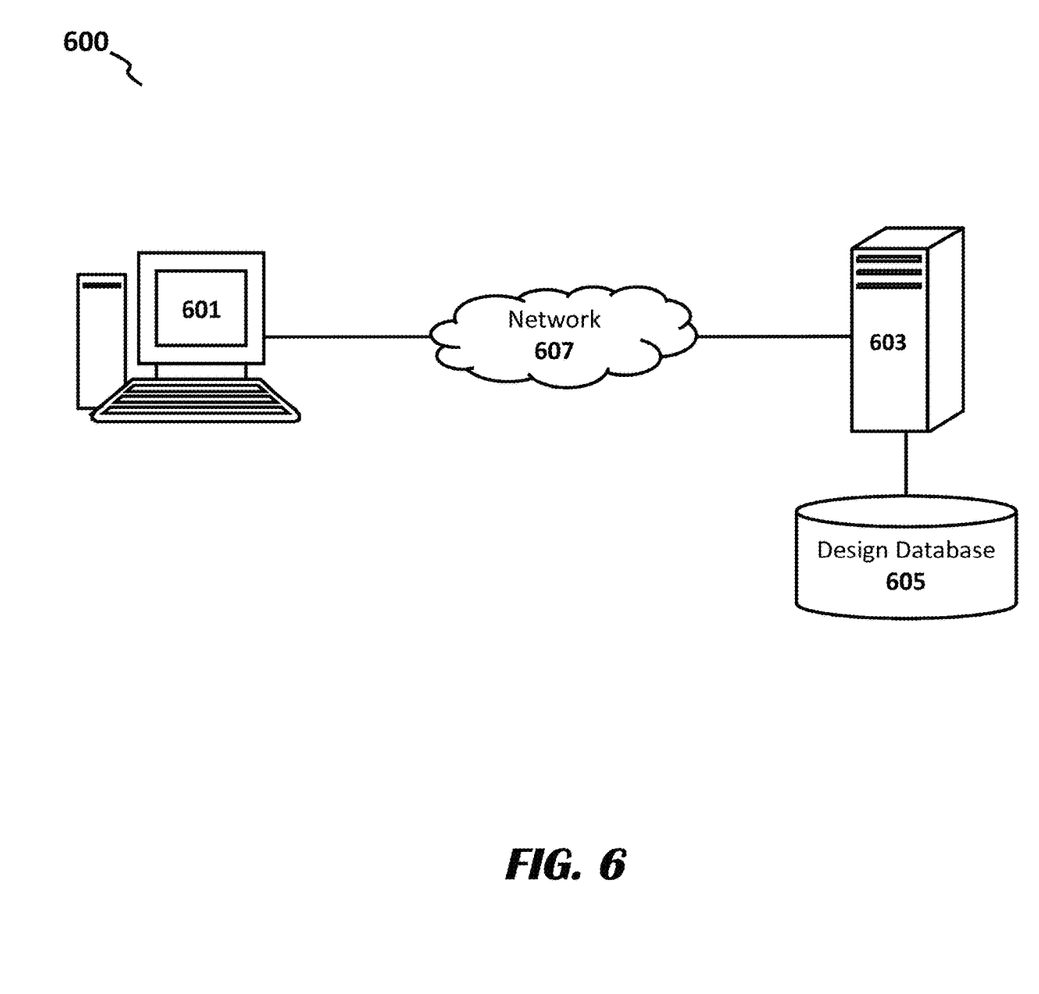
FIG. 6 shows components of a design system, according to an exemplary embodiment.

FIG. 6 shows components of a design system 600, according to an exemplary embodiment. The design system 600 may comprise any number of client computing devices 601, any number of server computing devices 603, a design database 605, and one or more networks 607. In operation, a user (e.g., circuit designer) operating a client computer 601 may interact with design interfaces configured for various stages of design and the corresponding design components. For instance, in one phase, the design software could generate a schematic layout interface displaying a schematic representation of design objects stored in records of a design database 605, and then, in a next phase, the design software may generate a design layout interface displaying a design layout representing using the schematic representation and the design database.

It should be appreciated that executing the processes of the design software may be distributed between any number of computing devices 601, 603. In some embodiments, the design software modules may be installed locally on a computer 601, 603. In such embodiments, the local computer 601, 603 is wholly responsible for executing the various processes of the design software, including accessing a locally stored design database 605. In some embodiments, such as the system 600 shown in FIG. 6, the client computer 601 and the server computer 603 may function in a client-server arrangement. For example, the client computer 601 may function as a thin client terminal, where the client computer 601 displays various interactive interfaces but the client computer 601 has few, if any, software modules of the design software stored locally and performs minimal processing for the design software. In embodiments organized into client-server arrangements, the various interactive interfaces displayed at the client computer 601 may instruct the client computer 601 to send, over one or more networks 607, various inputs captured from the interactive interfaces to a server computer 603. Design software processes may be executed by the server 603, instructing the server computer 603 to generate the interactive interfaces and/or the data of interactive interfaces based on the processes. The server computer 603 may transmit the data for the interactive interfaces to one or more client computers 601 over the one or more networks 607 to be displayed at the client computers 601.

Client computers 601 may provide users with the various hardware and software components for interacting with a design application, through various interactive interfaces. A client computer 601 may be any computing device comprising a processor capable of performing the various tasks and processes described herein. Non-limiting examples of client computers 601 may include laptops, workstations, tablets, servers, mobile devices, and the like. As mentioned, the client computer 601 may execute the various tasks and processes of the design software locally, or may share processing tasks with a server computer 603 by communicating with the server computer 603 over one or more networks 607. The client computer 601 may comprise a design database 605, or the client computer 601 may communicate with computers hosting the design database 605 over the one or more networks 607.

In operation, the client computer 601 may generate interactive graphical displays, which may be graphical user interfaces (GUIs) that allow designers to graphically interact with certain design phases of an ongoing design project. The client computer 601 may access or otherwise execute the EDA software in order to input various instructions related to designing a logic system, and to output user interfaces allowing the user to control execution of the EDA software. As an example, the client computer 601 may upload or otherwise input, to the EDA software, a machine-readable schematic design file. The EDA software may then automatically generate one or more records of the schematic design file, and/or one or more records for a layout design based upon the schematic design file. The EDA software may then generate a user interface that displays an interactive representation of the layout design records. Using the using the client computer 601 to interact with the interactive user interface, the user may manipulate the layout design and instances within the layout design.

Server computers 603 may execute various processes of a design software application be a computing device comprising a processor. A server 603 may be any computing device comprising a processor configured to host and execute one or more aspects of design software that may be accessed and operated by users, such as circuit designers and engineers, to design and model logic systems. In the exemplary system 600, the EDA software may be a cloud-based software application, hosted on any number of servers 603 in a distributed architecture, accessible to client computers 601 over one or more networks 607, such as the Internet or intranet. However, in some embodiments, some or all of the underlying software modules of the EDA software may be downloaded to and installed on a client computer 601. It should be appreciated that servers 603 may be any computing device comprising a processor capable of executing one or more tasks or processes described herein. Non-limiting examples of a server computer 603 may include a workstation computer, laptop computer, server computer, and tablet device.

A design database 605 may store records of design objects of an integrated circuit design project. The design database 605 may be hosted on one or more, computing devices comprising non-transitory machine-readable storage media configured to store the records of design objects, and one or more processors configured to execute various processes and tasks described herein, such as querying and updating the records of the design database 605. The design database 605 may contain records and attributes of design objects that are used by the server computer 603 to generate interactive GUIs representing various stages of an ongoing design project. For example, the design database 605 may store records and attributes of design objects of a design layout that is represented by an interactive layout GUI generated by the design software. As another example, in some implementations, the design database 605 may store data for a schematic of a multi-level hierarchical circuit design. In such implementations, the design software executed by the server computer 605 may receive data records for a schematic from another device or from the design database 605. In some cases, the design software may then generate the records and attributes of a layout for the circuit design, using the schematic data. The layout data records may be then be used by the server computer 605 and/or client computer 601 to generate the interactive GUI representing the layout.

In operation, the design database 605 may receive schematic designs and/or layout designs from the servers 603, as submitted from client computers 601. The records for a schematic design may represent and generate schematic symbols for schematic instances and schematic diagrams. Records for the layout design may represent and generate layout designs at various hierarchical levels; layout instances at various hierarchical levels; and layout diagrams. The records of schematic instances and the records of layout instances may comprise attributes describing that particular instance. The EDA software may query and update these attributes based upon the user-inputted commands, received from a user who may be interacting with a graphical user interface representing the instances. The EDA software may function as a WYSIWYG editor for the attributes of the underlying instances stored in the design database 605. As client computers 601 manipulate instances of a layout design using the EDA software, the server 603 may automatically issue instructions to the design database 605 to update the records of the layout design and layout instances accordingly.

A record of a design object stored in the design database 605 may comprise one or more data fields. The data fields may contain data corresponding to one or more attributes of the design object. The record of each design object may store machine-readable attribute data indicting for the design software the various attributes of the particular design object. The design software may then use this data to generate the interactive layout interface displaying the object, such that the object is represented in the layout according to the attributes. In other words, the attributes may instruct the interactive interface on how to present a shape or pictogram representing an object, within the context of a particular layout interface. In some cases, different objects and shapes may have the same attribute fields; and in some cases, objects and shapes may have different attribute fields. Non-limiting examples of attributes that may be stored in the data fields of records may include a type of the object, a layer-purpose association attribute, a bounding box attribute, one or more location attributes, and one or more attributes corresponding to geometric features for representing the object, among others.

As an example, to represent a facet in a layout GUI, a record of a facet object may contain attributes, such as, an indicator that the design object is a facet, a facet width, a facet angle, a facet location, and a radius. Attribute data in the record of a design object (e.g., facet object) may be stored in a machine-readable format that allows design software executed by the server 603 and/or the client computer 601 to generate a layout GUI displaying a design layout for an integrated circuit containing the particular design objects. Records and attribute data for design objects may be generated by design software based on a user's interactions with the layout GUI and/or by a dataset for a schematic of the circuit design generated in a preceding design phase. The computer 601, 603 executing the software design may generate the data or transmit instructions for generating the data, which may be stored into the design database 605 or may update the data stored in the design database 605. In operation, the design database 605 may be updated in real-time according to inputs to the display GUI, received from the user operating the display GUI.

A system 600 may comprise one or more networks 607 of hardware and software components configured to support communication between the various devices of the system, such as the client computer 601 and server computer 603. Non-limiting examples of hardware and software network components may include routers, switches, and firewalls, among others. The networks 607 of the system 600 may include private networks, public networks, or a hybrid of public and private networks. The hardware and software devices of the networks 607 may use any number of networking protocols capable of supporting communications between the devices. Non-limiting examples of communications protocols that may be used by the networking components may include HTTP, SSL, FTP, TCP/IP, Wi-Fi, 3G, 4G, and LTE, among others.

Figure 7:
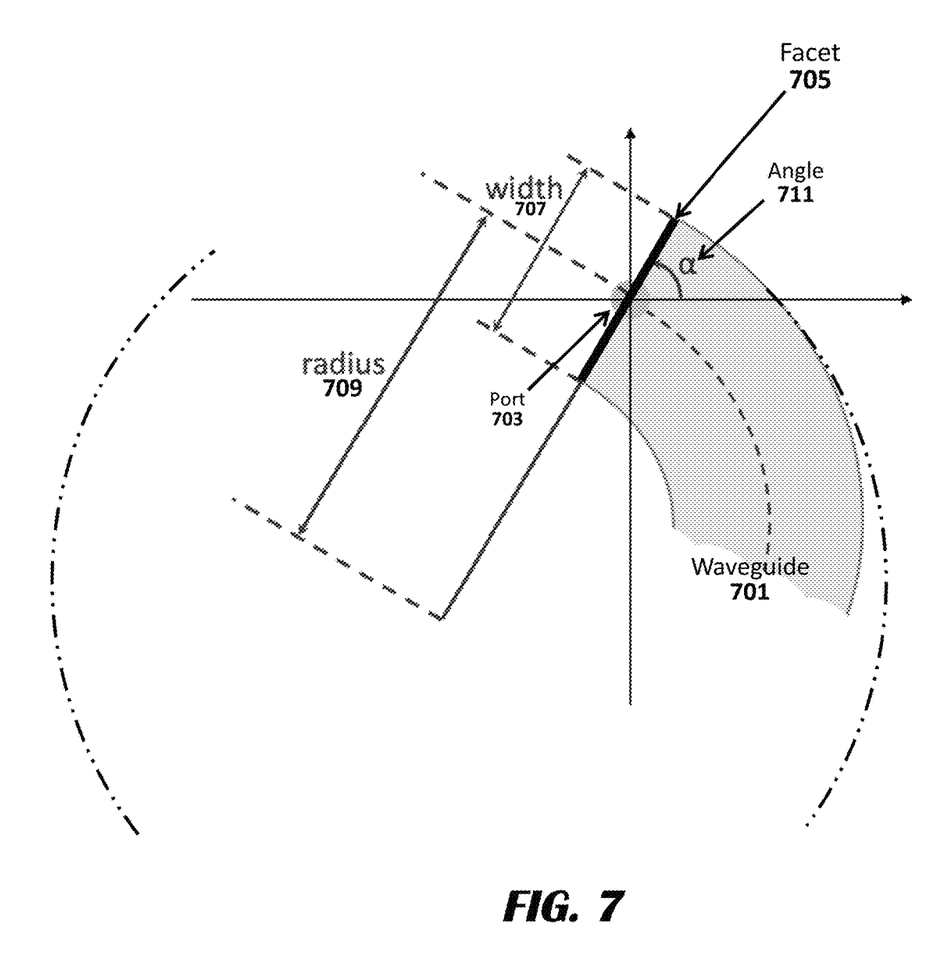
FIG. 7 shows components a waveguide object.

FIG. 7 shows components a waveguide object 701, a port object 703, a facet object 705, and facet attributes 707, 709, 711, which may be stored in a design database. The underlying data stored in the design database for each object 701, 703, 705, may be used to generate a layout GUI. In operation, a waveguide object 701 may be generated on the layout GUI to match the attributes, width 707, radius 709, and angle 711 attributes of two facets 705 of the of the waveguide object 701, sometimes referred to as a "top" facet and a "bottom" facet.

A port object 703 may be a graphical representation of a physical port or pin of a layout design. Unlike conventional design systems, which generate representations of electrical and photonics ports as a square, a port object 703 may have a geometry or shape that fits within the waveguide object 701, regardless of the curvature of the waveguide object 701. For instance, the waveguide object 701 may have circular shape, an elliptical shape, a dodecahedral shape, or some other shape that fits within the boundaries of a curved waveguide 701. As previously mentioned, a facet 705 of a waveguide 701 may be a location on a design layout where the waveguide 701 meets the port 703. The design database may contain attributes associated with the port object 703, such as a location attribute.

The design database may store a set of facet attributes 707, 709, 711 associated with a facet object 705 and/or waveguide 701, including a facet width attribute 707, a waveguide radius attribute 709, and a facet angle attribute 711.

Figure 11A:
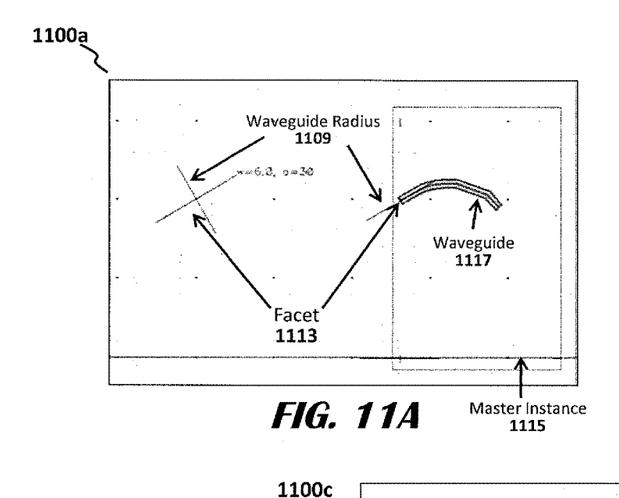
FIGS. 11A, 11B, and 11C are screenshots of interactive display GUIs, according to an exemplary embodiment.
Figure 11B:
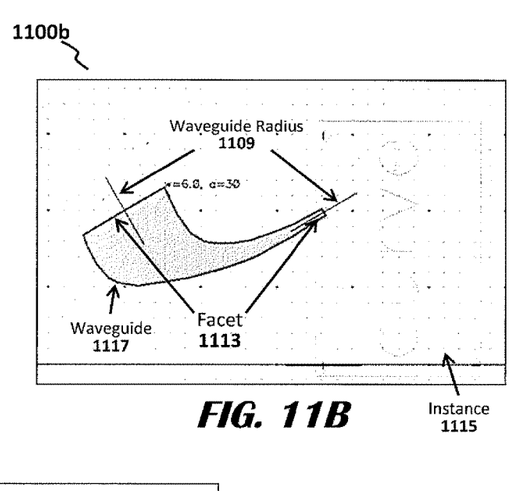
Figure 11C:
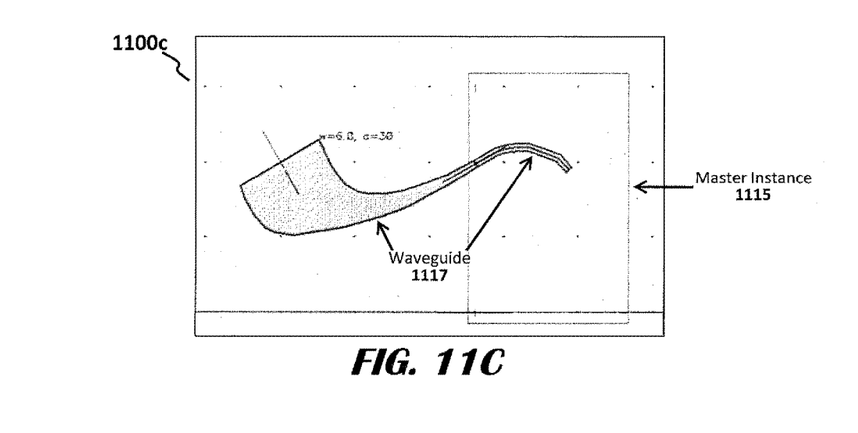

A width attribute 707 is the length of the facet 705 at the location where the waveguide 701 touches the port object 703. It should be noted that the width attribute 707 is found at the location the waveguide 701 intersects the port object 703, and that the width of the waveguide 701 may vary. For example, FIGS. 11A-C show a tapered waveguide having a wider width at a top port and a narrower width at a bottom port, and thus the width attribute 707 of the facet 705 at the top port is wider than the width attribute 707 at the facet 705 at the bottom port, and the width of the waveguide varies in between the two facets 705. In addition, it should also be noted that, in some cases, the width attribute 707 may be unrelated to the width of the graphical representation of the port object 703. For example, the user may manipulate the width of the port object 703 displayed on the screen, but the width attribute 707 of the facet 705 intersecting that port object 703 remains constant, unless the value of the width attribute 707 is manipulated by the user.

A radius attribute 709 may be the curvature radius of the waveguide 701. The value of the radius attribute 709 may represent the severity of the curvature of the waveguide 701. For instance, the larger the value for the radius attribute 709, the wider and less severe the curvature of the waveguide 701; in contrast, the smaller the value for the radius attribute 709, the tighter and more severe the curvature of the waveguide 701. In some implementations, the radius attribute 709 in the database may be stored with an additional curvature component indicating the direction of curvature. For example, the radius attribute 709 may be a positive or negative value, where a positive value (+x) indicates curvature of the waveguide 701 in one direction and a negative value (−x) indicates curvature of the waveguide 701 in the other direction. It should be appreciated that any number of additional or alternative means of indicating curvature direction may be used or calculated with a radius attribute 709.

An angle attribute 711 may be the angle of the facet 705 at the port 703 with respect to a set of coordinates on an x-axis and y-axis. The angle attribute 711 may be used by the design software to determine an access direction associated with the port object 703, which may indicate a "side" of the design hierarchy from which the port object 703 originates and/or a hierarchical destination of the waveguide object 701 intersecting the port 703.

It should be noted that graphical shapes may not have an orientation attribute, so changing the orientation of the photonic port shape 703 requires certain attributes to be maintained that are dependent upon orientation, such as an angle attribute 711. For example, if the user rotates a layout by 90 degrees, then the software may add 90 degrees to the angle attribute 711 for each photonic port at that level of hierarchy.

Figure 8:
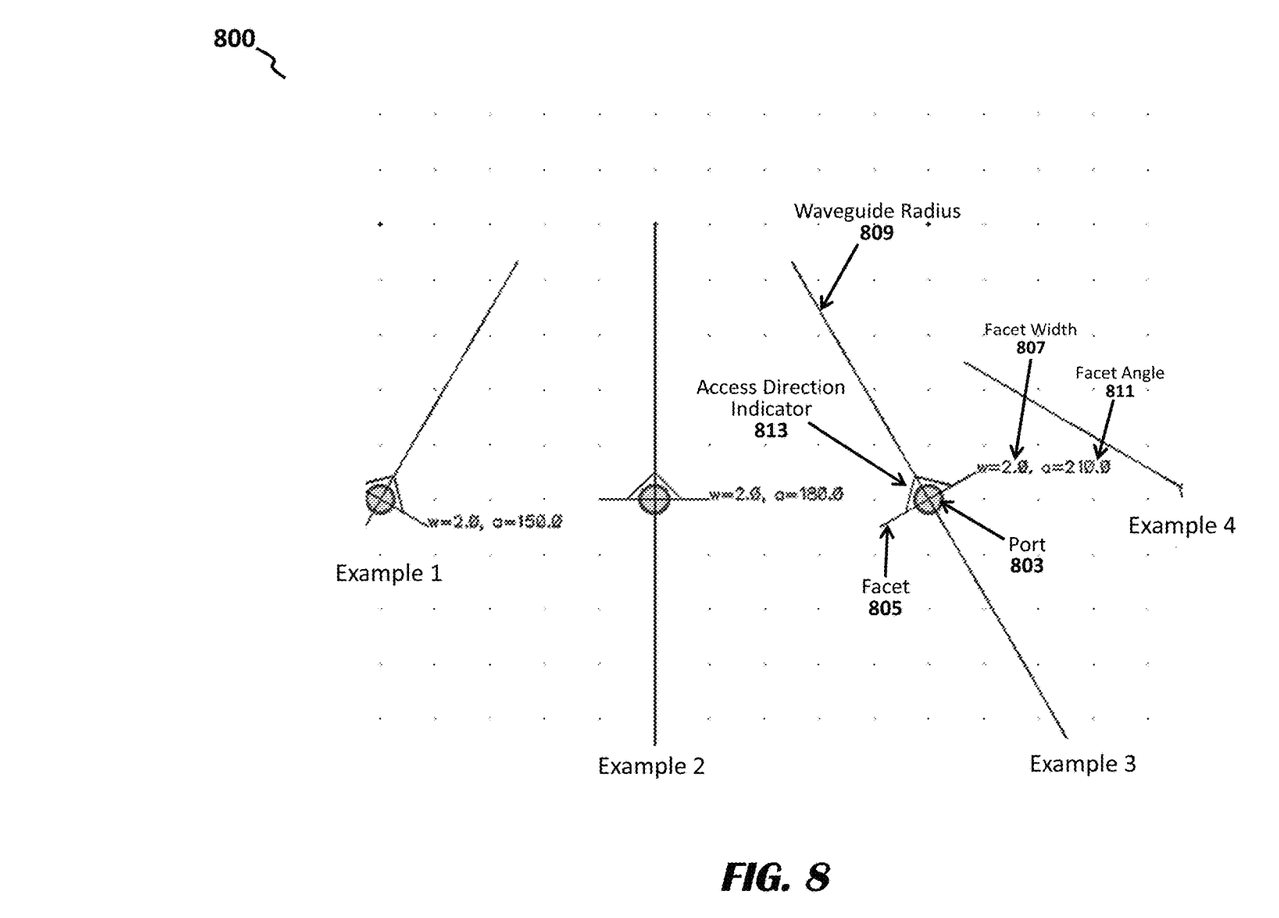
FIG. 8 is a screenshot of a layout display GUI containing various examples of the same photonics port, according to an exemplary embodiment

FIG. 8 is a screenshot of a layout display GUI 800 containing various examples of the same photonics port 803, according to an exemplary embodiment. Each example shows a photonics port 803, a facet 805, a wavelength radius 809, and an access direction indicator 813. In addition, the examples show the width attribute 807 and angle attribute 811 for the facet 805 in, each example. FIG. 8 shows the same set of objects and attributes, but at different intersecting angles.

In operation, a user may input into the layout GUI 800 instructions to "draw" or otherwise generate a port object 803 and a facet object 805. The computer may determine a width attribute 807 corresponding to the length of the facet 805 where the facet 805 intersects the port 803, and an angle attribute 811 corresponding to the angle at which the facet object 805 intersects the port 803. The computer may then store the width attribute 807 and angle attribute 811 into a design database. In some cases, the user may generate a representation of the radius attribute 809, which may be an abstract representation of the curvature of the waveguide 801 at the location the waveguide 801 intersects the port object 803. It should be noted that the radius attribute 809 and the representation of the radius attribute 809 do not have to be directly related. For instance, the size of the representation of the radius attribute 809 may be directly proportional to the value of the radius attribute 809 stored in the design database by default. In some implementations, the user may input a scaling factor into a configuration interface, which may be stored into a configuration file or user profile. According to the scaling factor, the representation of the radius attribute 809 may be displayed with a size that is scaled according to the scaling factor. Additionally or alternatively, in some implementations, the system may apply normalization factor to certain features that may affect the radius attribute 809. For instance, the user may be import one or more master instances into an ongoing design, so the system may need to normalize the values of the new components. Nevertheless, it should be appreciated that although the normalization factor may be applied to a radius attribute 809 on the display, the underlying value of the radius attribute 809 may remain unaffected by the normalization.

An access direction indicator 813 may be a graphic or pictogram representing connectivity direction for the waveguide where the facet 805 meets the port 803. The access direction indicator 813 may be generated having a set of one or more characteristics representing the access direction, sometimes referred to as "inside" and "outside." For instance, in some implementations, "inside" may be the side of the facet 805 corresponding to a threshold value, such as −90 degree rotation, indicating that the port 813 directs the waveguide to the same or lower hierarchical level (e.g., an instance master). Although the access direction indicator 813 is shown as a triangle shape in the various exemplary embodiments herein, it should be appreciated that the shape of the indicator 813 and the placement of the indicator 813 may be any number of shapes and may be placed in any number of locations. Moreover, the indicator 813 may have any number of additional or alternative characteristics, including shape, placement, color, and size, among others. The characteristics of the indicator 813 may also vary to indicate whether the access direction is "inside" or "outside." In some embodiments, a user may configure the interactive GUI 800 to customize the characteristics of access direction indicators 813 according to the user's preferences, and based upon predefined and/or user-configurable thresholds, such as angular value thresholds of the angle attributes 811.

Figure 9:
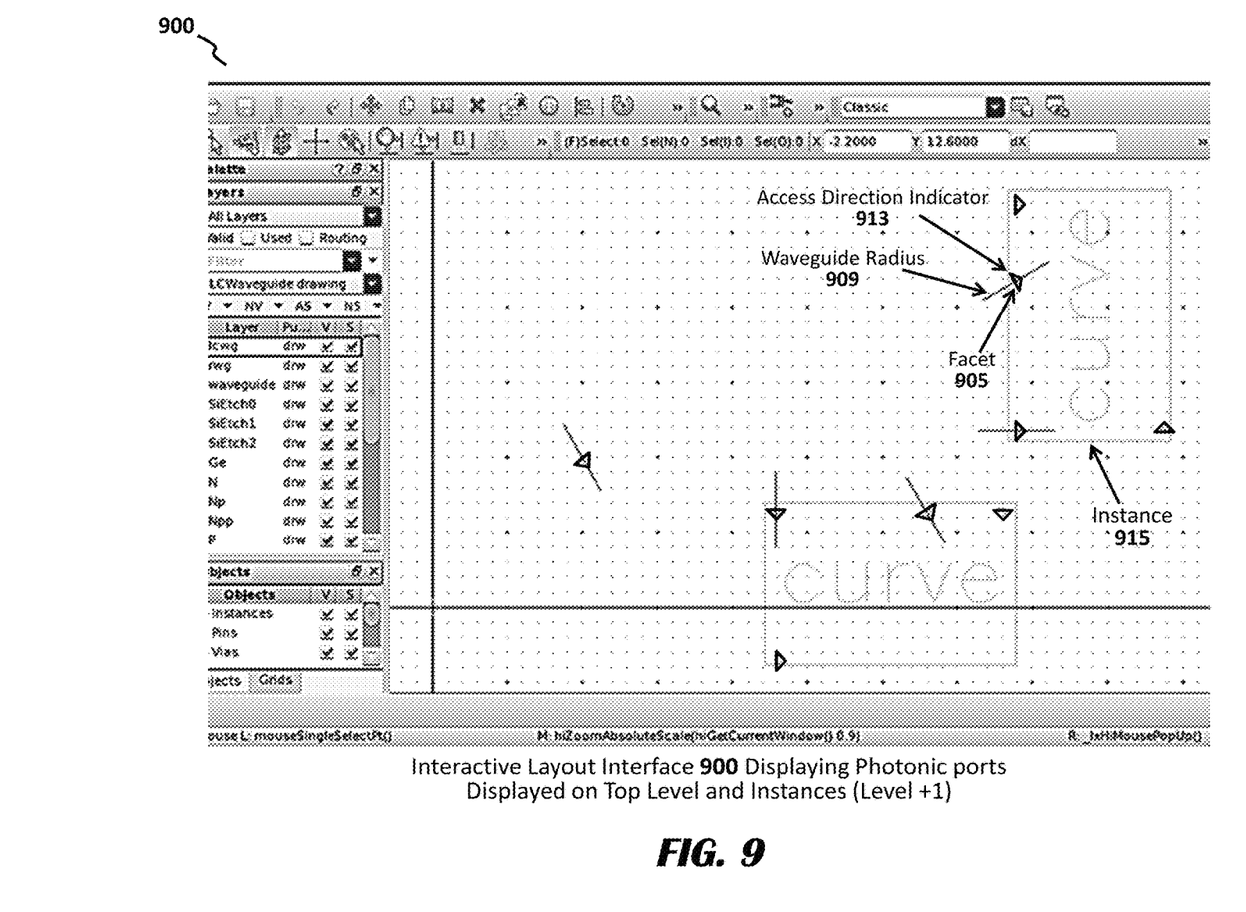
FIG. 9 is a screenshot of an interactive layout GUI.

FIG. 9 is a screenshot of an interactive layout GUI 900 that displays photonic ports at a "top" hierarchical level and instances 915 for a next hierarchical level, according to an exemplary embodiment. Unlike FIG. 8, the exemplary layout GUI 900 may be a "zoomed out" view, such that the ports may be too small to be visible on the GUI 900. More specifically, the screenshot of the layout GUI 900 shows facets 913 and instances 915 at a top level of the design layout, where the instances 915 of an instance master located a next hierarchical level.

An access direction indicator 913 may be generated according to the angle attribute in the design database. In the exemplary screenshot 900, the access direction indicator 913 may be a triangle shape or caret that "points" in the direction of the instance 915. According to this exemplary embodiment, the characteristics of the caret may indicate that the port is "inside" to the instance 915, though it should be appreciated that any number of characteristics for an access direction indicator 913 may be used to indicate whether the port is "inside" or "outside" the top level or the instance 915. In some embodiments, a waveguide router, which may be a software module of the design application, may automatically connect the "inside" side of a top level facet 913 to the "outside" side of the instance facet 913 (on the same net), while still respecting the width attribute of the facet 913, the angle attribute, and the radius attribute of the waveguide radius 909.

Figure 10A:
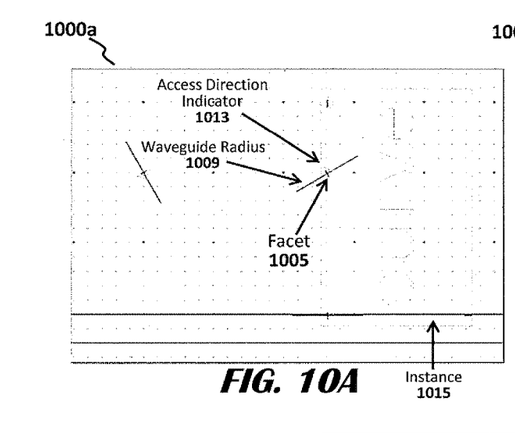
FIGS. 10A, 10B, and 10C are screenshots of interactive display GUIs, according to an exemplary embodiment.
Figure 10B:
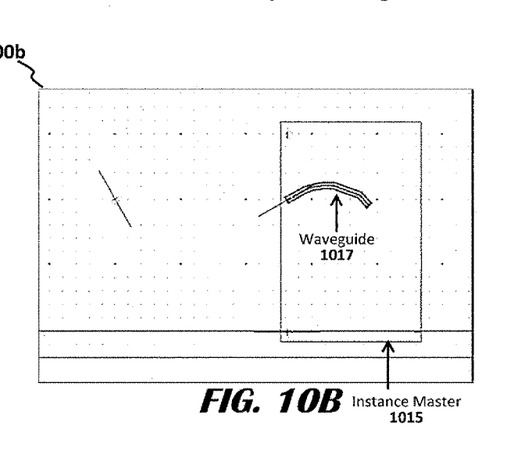
Figure 10C:
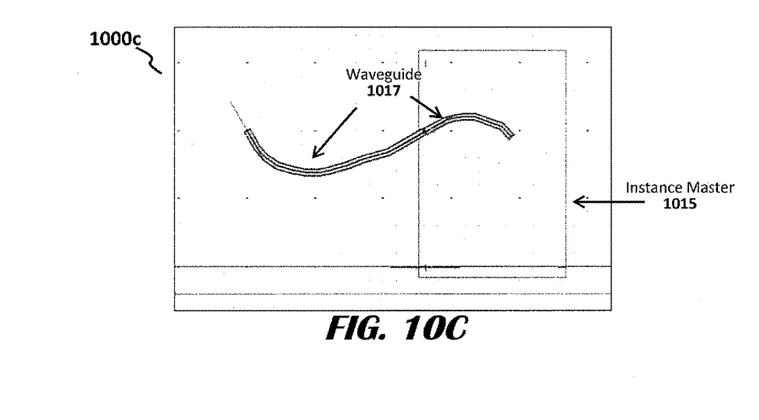

FIGS. 10A, 10B, and 10C are screenshots, of interactive display GUIs 1000, according to an exemplary embodiment. The GUIs 1000 show a "top-level" (e.g., Display Level 0) and then a next display level (e.g., Display Level 1) showing the design layout features within the instance 1015. The screenshots 1000 show how waveguides 1017 would appear in various levels of a display layout of the interactive GUI 1000. A first screenshot 1000a shows a port, an access direction indicator 1013, a facet 1005, and an instance 1015, at a top hierarchical level. A second screenshot 1000b shows an instance 1015 containing an internal waveguide 1017 at the next hierarchical level. The third screenshot 1000c shows a waveguide 1017 created at the top level, between the top level port, and the instantiated instance 1015 of that instance master 1015. It should be appreciated that, in a bottom-up design methodology, the waveguide 1015 "inside" of the instated instance 1015 can be pre-existing, but it is not required. A user may manually "draw" or otherwise generate the waveguide 1017 within the instance 1015, at the next hierarchical level. Additionally or alternatively, the design software may automatically generate or assist the user in generating the waveguide connection within the instance 1015, between each facet 1005 of the waveguide 1017. In some cases, a user operating the GUI 1000 may manipulate the photonic port display at the instance 1015 to update the attributes of the port, facet 1005, and/or waveguide 1017. For example, the user may move or rotate the port or the facet 1005 to update the angle attribute for the port attribute 1015, and thus change the access direction for the facet to an "outside" access direction. In response to the user's inputs into the GUI 1000, the computing device executing the design software, such as a client computer or server computer may then update the attributes of the objects in the design database. The computing device may update aspects of the GUI 1000 according to the user inputs, such as the access direction indicator 1013.

FIGS. 11A, 11B, and 11C are screenshots of interactive display GUIs 1100, according to an exemplary embodiment. The GUIs 1100 show a "top-level" (e.g., Display Level 0) and then a next display level (e.g., Display Level 1) showing the design layout features within the instance 1115, where there is a tapered waveguide from the top port to the bottom port. The screenshots 1100 show how waveguides 1117 would appear in various levels of a display layout of the interactive GUI 1100, where the width attribute of the facet 1113 at the top port is different from the width attribute of the facet 1113 at the bottom port. The first screenshot 1111a shows ports and the inside of an instance 1115 before a top level waveguide 1117 is created, an access direction indicator 1113, and facets 1105 at a top hierarchical level, where the waveguide 1117 is shown within the instance 1115 at the next hierarchical level. The second screenshot 1100b shows the top level after the top-level waveguide 1117 has been created, and a top level view of the instance 1115. The third screenshot 1100c shows the full waveguide 1117 created at the top level, from each of the hierarchical levels, within the instantiated instance 1115 of that instance master 1115. It should be noted that when implemented during a top-down methodology, the exemplary embodiments for generating and displaying an optical port may be used to create the waveguide 1117 internal to, the instance. 1115; while on a bottom-up methodology, the exemplary embodiments may be implemented via a router module to drive the top level routing and automated waveguide 1117 creation.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   receiving, by a computer, a set of attributes of a port object from a design database configured to store one or more sets of attributes of one or more design objects respectively, the set of attributes of the port object comprising a port location;
   receiving, by the computer, a set of attributes of a facet object from the design database, the set of attributes of the facet object comprising a width attribute, a radius attribute, and an angle attribute, the facet object comprising a facet location intersecting the port location;
   determining, by the computer, an access direction based upon the angle attribute; and
   based upon the angle attribute, the width attribute, the radius attribute, and the access direction:
   generating, by the computer, a representation of the port object, a representation of the facet object, a representation of a direction indicator based on the access direction, and a representation of a radius indicator on an interactive design interface representing a design layout.

2. The method according to claim 1, wherein the representation of the port object has geometric features capable of display within the width attribute of the facet object.

3. The method according to claim 1, further comprising generating, by the computer, a representation of a waveguide object according to the set of one or more attributes of the waveguide object stored in the design database,
   wherein the facet object is a component of the waveguide object, and
   wherein the representation of the port object has geometric features capable of display within the representation of the waveguide object.

4. The method according to claim 1, wherein generating the direction indicator further comprises:
   determining, by the computer, one or more visual features of the representation of the direction indicator based upon the access direction associated with the facet object.

5. The method according to claim 4, wherein the representation of the direction indicator is generated having a first visual feature when the access direction indicates that the port is associated with a higher hierarchical level of the design layout.

6. The method according to claim 4, wherein the representation of the direction indicator is generated having second visual feature when the access direction indicates that the port is associated with a lower hierarchical level of the design layout.

7. The method according to claim 6, further comprising generating, by the computer, a representation of an instance object on the interactive design interface according to the set of one or more attributes of the instance object,
   wherein port location of the port object intersects a location attribute of the instance object at a hierarchical level in the design layout, and associates the port with the lower hierarchical level.

8. The method according to claim 7, further comprising generating, by the computer, on the interactive interface at a first hierarchical level of the design layout, a representation of the waveguide object in accordance with the set of attributes of the waveguide object, the set of attributes of the port object, and the set of attributes of the facet object, wherein the interactive interface is configured to display a plurality of hierarchical levels of the design layout, and wherein the instance object is displayed independent of the waveguide object at the first hierarchical level.

9. The method according to claim 8, further comprising: generating, by the computer, on the interactive interface at the lower hierarchical level of the design layout, the representation of the instance object according to set of attributes of the instance object; and generating, by the computer, on the interactive interface at the lower hierarchical level of the design layout, the representation of the waveguide object in accordance with the set of attributes of the waveguide object, the set of attributes of the port object, and the set of attributes of the facet object, wherein at least a portion of the representation of the waveguide object is displayed within at least a portion of the representation of the instance object.

10. The method according to claim 1, wherein the representation of the radius attribute is further generated based upon a scaling factor, wherein the scaling factor is independent of the radius attribute stored in the design database.

11. The method according to claim 1, further comprising generating, by the computer, one or more attributes in the set of one or more attributes of the facet object, in response to receiving one or more inputs via the interactive design interface manipulating the facet object.

12. The method according to claim 11, wherein the interactive design interface is presented at a second computer, and wherein the one or more inputs are received from the second computer.

13. A system comprising:
a design database hosted on one or more computing devices comprising non-transitory machine-readable storage media configured to store one or more sets of one or more design objects respectively; and
a computer coupled to the design database and comprising a processor configured to:
receive a set of attributes of a port object from the design database, the set of attributes of the port object comprising a port location;
receive a set of attributes of a facet object from the design database, the set of attributes of the facet object comprising a width attribute, a radius attribute, and an angle attribute, the facet object comprising a facet location intersecting the port location;
determine an access direction based upon the angle attribute; and
based upon the angle attribute, the width attribute, the radius attribute, and the access direction:
generate an interactive design interface representing a design layout and comprising a representation of a port object, a representation of the facet object, a representation of a direction indicator, and a representation of a radius indicator.

14. The system according to claim 13, wherein the representation of the port object has geometric features capable of display within the width of the facet object.

15. The system according to claim 13, wherein the computer is further configured to:
generate the representation of the direction indicator having a set of one or more visual features according to the access direction associated with the facet object.

16. The system according to claim 13, wherein the interactive interface is configured to display a plurality of hierarchical levels of the design layout; and
wherein the computer is further configured to generate on the interactive interface, at the first hierarchical level, a representation of a waveguide object and a representation of an instance object,
wherein the computer generates the representation of the waveguide object in accordance with the set of attributes of the waveguide object, the set of attributes of the port object, and the set of attributes of the facet object,
wherein the computer generates the representation of the instance object in accordance with the set of attributes of the instance object in the design database, and
wherein the representation of the waveguide object is displayed independent of the representation of the instance object.

17. The system according to claim 16, wherein the computer is further configured to generate on the interactive interface, at a second hierarchical level, the representation of the waveguide object and the representation of the instance object, wherein at least a portion of the representational of the waveguide overlaps at least a portion of the representation of the instance object.

18. The system according to claim 13, wherein the computer is further configured to receive one or more configuration inputs from a configuration interface, and wherein the representation of the radius attribute is further generated based upon a configuration input indicating a scaling factor received from the configuration interface, and
wherein the scaling factor is a value changing the representation of the radius on the interactive interface, and is independent of the radius attribute stored in the design database.

19. The system according to claim 13, wherein the computer is further configured to receive one or more inputs manipulating the facet object via the interactive design interface, and generate one or more attributes in the set of one or more attributes of the facet object based upon the one or more inputs manipulating the facet object; and
wherein the design database the further configured to store the one or more attributes of the facet object generated according to the inputs from the interactive design interface.

* * * * *